United States Patent
Liu et al.

(10) Patent No.: US 11,932,662 B2
(45) Date of Patent: *Mar. 19, 2024

(54) METHOD FOR PREPARING GLUFOSINATE OR ANALOGUE THEREOF

(71) Applicant: LIER CHEMICAL CO., LTD., Sichuan (CN)

(72) Inventors: Yongjiang Liu, Sichuan (CN); Min Xu, Sichuan (CN); Lei Zhou, Sichuan (CN); Wei Zeng, Sichuan (CN); Ke Cheng, Sichuan (CN)

(73) Assignee: LIER CHEMICAL CO., LTD., Sichuan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,054

(22) Filed: May 1, 2023

(65) Prior Publication Data

US 2023/0265115 A1    Aug. 24, 2023

Related U.S. Application Data

(63) Continuation of application No. PCT/CN2022/106741, filed on Jul. 20, 2022.

(30) Foreign Application Priority Data

Jul. 20, 2021 (CN) .......................... 202110820719.X (51) Int. Cl.
*C07F 9/30* (2006.01)

(52) U.S. Cl.
CPC .................................. *C07F 9/301* (2013.01)

(58) Field of Classification Search
CPC .... C07F 9/301; C07F 9/30; C07F 9/32; C07F 9/4866; C07F 9/4891; C07F 9/52; C07C 271/22; Y02P 20/55
See application file for complete search history.

(56) References Cited

U.S. PATENT DOCUMENTS

| 5,442,088 A * | 8/1995 | Hoffmann | C07C 311/19 560/150 |
| 11,680,077 B2 * | 6/2023 | Liu | C07F 9/4891 562/11 |

FOREIGN PATENT DOCUMENTS

| CN | 103396440 | | 11/2013 | |
| CN | 108727427 | | 11/2018 | |
| CN | 111004281 | * | 4/2020 | |
| CN | 111662324 | | 9/2020 | |
| WO | 2020145513 | | 7/2020 | |
| WO | 2020145627 | | 7/2020 | |
| WO | WO-2020145627 A1 | * | 7/2020 | |
| WO | WO-2021147894 A1 | * | 7/2021 | .............. C07F 9/301 |

OTHER PUBLICATIONS

Bayer et al. (25. Stoffwechselprodukte von Mikroorganismen, Phosphinothricin und Phosphinothricyl-Alanyl-Alanin, Heletica Chimica Acta—vol. 55, Fasc. 1, Nr. 25, pp. 224-239) (Year: 1972).*
German to English 11 pages 2023 (Year: 2023).*
WO2020/145627 translated (Year: 2020).*
Amine Protecting Groups 2 pages Published 2005 (Year: 2005).*
CN111004281 translated (Year: 2020).*
Wiles et al. (Recent advances in micro reaction technology, ChemComm, 47, pp. 6512-6535, Published 2011) (Year: 2011).*
Williams DB, Netshiozwi TE. Synthesis and characterisation of severely hindered P-OR compounds. Tetrahedron. Nov. 28, 2009;65(48):9973-82.

* cited by examiner

*Primary Examiner* — Yevgeny Valenrod
*Assistant Examiner* — Blaine G Doletski
(74) *Attorney, Agent, or Firm* — Robin L. Teskin; Baker, Donelson, Bearman, Caldwell & Berkowitz PC (57) ABSTRACT

The present invention relates to a method for preparing glufosinate or an analogue and an intermediate thereof. The method comprises: a) reacting a compound of formula (II), an alcohol of formula (III) and a compound of formula (V); and b) hydrolyzing the product of the reaction above to obtain glufosinate of formula (IV) or an analogue thereof.

34 Claims, 2 Drawing Sheets

METHOD FOR PREPARING GLUFOSINATE OR ANALOGUE THEREOF

CROSS-REFERENCE TO RELATED APPLICATIONS

This application is a continuation application of Int'l Chinese Appl. No. PCT/CN2022/106741, filed Jul. 20, 2022, which claims priority to Int'l Chinese Appl. No. 202110820719.X filed Jul. 20, 2021, each and all of which are incorporated herein by reference in their entireties.

FIELD OF THE INVENTION

The present invention relates to a process for preparing glufosinate or analogue and intermediate thereof.

BACKGROUND OF THE INVENTION

Glufosinate is a high-efficiency, broad-spectrum, low-toxicity, non-selective (biocidal) organophosphorus herbicide having partial systemic action developed by Hoechst AG in the 1980s, and can be used to control annual and perennial dicotyledonous and grass weeds.

Existing processes for preparing glufosinate are complicated and use limited raw materials, and thus, it is necessary to develop a new process for preparing glufosinate or its analogue.

SUMMARY OF THE INVENTION

The present invention provides a process for preparing glufosinate or its analogue of formula (IV), comprising:

(IV)

a) reacting a compound of formula (II), an alcohol of formula (III) and a compound of formula (V), b) subjecting products obtained from the above reaction to a hydrolysis, to obtain the glufosinate or its analogue of formula (IV), wherein $R_1$ and $R_2$ are each independently selected from $C_1$-$C_{16}$ alkyl, $C_6$-$C_{12}$ aryl, $C_3$-$C_{10}$ cycloalkyl, $C_7$-$C_{12}$ alkaryl and $C_7$-$C_{12}$ aralkyl, each group being unsubstituted or substituted by $C_1$-$C_6$ alkyl, $C_1$-$C_6$ alkoxy, dialkyl or dialkylamino; and for example, $R_1$ is selected from methyl, ethyl, propyl, isopropyl, butyl, isobutyl, amyl, hexyl, phenyl, benzyl, phenethyl, phenylpropyl, methylphenyl, ethylphenyl and propylphenyl, and $R_2$ is $C_1$-$C_8$ alkyl;

$Hal_1$ is halogen, $Hal^2$ is halogen,

PG is hydrogen or an amino-protecting group, wherein when PG is the amino-protecting group, the process further comprises removing the amino-protecting group, and X is $-OR_3$ or $-NR_3R_4$, wherein $R_3$ is $C_1$-$C_{16}$ alkyl, $C_6$-$C_{16}$ aryl, $C_3$-$C_{16}$ cycloalkyl, $C_7$-$C_{16}$ aralkyl or $C_7$-$C_{16}$ alkaryl, wherein the groups are each unsubstituted or substituted by $C_1$-$C_6$ alkyl; and $R_4$ is hydrogen or as defined for $R_3$.

DETAILED DESCRIPTION OF THE INVENTION

The present invention will be described in the following paragraphs in more detail. Unless explicitly pointed out to the contrary, each aspect such described can be combined with any one or more other aspects. Particularly, any preferable or advantageous feature can be combined with any one or more other preferable or advantageous features.

In the context of the present invention, the terms used will be explained according to the following definitions unless otherwise indicated in the context.

As used herein, "a", "an", "the" and "said" comprise single and plural referents, unless otherwise explicitly indicated in the context.

As used herein, the terms "comprising" and "be comprised of" have the same meaning as "including", "having" or "containing", are inclusive or open-ended, and do not exclude other member, element or process step not enumerated.

Enumeration of end points of numerical value includes all numbers and fractions falling within a corresponding range, as well as the endpoints enumerated.

Unless otherwise defined, all terms (including technical terms and scientific terms) used in the process of disclosing the present invention have the same meaning as commonly understood by one of ordinary skill in the art to which the present invention pertains.

Definition

The term "microchannel reactor" as used herein refers to a continuous flow reactor of which the reaction channels have an equivalent diameter of less than 5 millimeters.

The term "tube reactor" as used herein refers to a continuous flow reaction of which the reaction channels are not packed with fillers and have an effective diameter greater than that of "microchannel reactor" as described above.

The term "tubular packed reactor" as used herein refers to a continuous flow reactor of which the reaction channels are packed with fillers and have an effective diameter greater than that of "microchannel reactor" as descried above.

The term "residence time" as used herein refers to the time it takes from simultaneously mixing the reactants, which participate in a reaction, in a reactor to react to leaving the reactor after the reaction. The residence time can be calculated by the following method:

The residence time $T_s$ is calculated as follows:

$$T_s = \frac{V}{Q}$$

$$Q = \sum_i \frac{G_i}{\rho_i}$$

wherein: $T_s$—the residence time, second (s);
V—the total volume of the reactor, mL;
Q—the total volume flow rate of reaction materials, mL/min;
$G_i$—the mass flow rate of each reaction material, g/min; and
$\rho_i$—the density of each reaction material, g/mL.

In the present disclosure, when the reactants involve ammonia gas, ammonia gas is not included as a reactant in the above calculation method.

The term "amino-protecting group" as used herein refers to a group which can be attached to a nitrogen atom in an amino group so as to protect the amino group from participating in a reaction and can be easily removed in a subsequent reaction. Suitable amino-protecting groups include, but not limited to, the following protecting groups: a carbamate group of formula —C(O)O—R, wherein R is, for example, methyl, ethyl, tert-butyl, benzyl, phenylethyl, $CH_2$=CH—$CH_2$—, and the like; an amide group of formula —C(O)—R', wherein R' is, for example, methyl, ethyl, phenyl, trifluoromethyl, and the like; an N-sulfonyl derivative-group of formula —$SO_2$—R", wherein R" is, for example, tolyl, phenyl, trifluoromethyl, 2,2,5,7,8-pentamethylchroman-6-yl-, 2,3,6-trimethyl-4-methoxybenzene, and the like.

A Process for Preparing a Compound of Formula (I)

The present invention provides a process for preparing a compound of formula (I), comprising:

(I)

reacting a compound of formula (II) with an alcohol of formula (III) in a molar ratio of higher than 1:2, wherein $R_1$ and $R_2$ are each independently selected from $C_1$-$C_{16}$ alkyl, $C_6$-$C_{12}$ aryl, $C_3$-$C_{10}$ cycloalkyl, $C_7$-$C_{12}$ alkaryl and $C_7$-$C_{12}$ aralkyl, each group being unsubstituted or substituted by $C_1$-$C_6$ alkyl, $C_1$-$C_6$ alkoxy, dialkyl or dialkylamino; for example, $R_1$ is selected from methyl, ethyl, propyl, isopropyl, butyl, isobutyl, amyl, hexyl, phenyl, benzyl, phenethyl, phenylpropyl, methylphenyl, ethylphenyl and propylphenyl, and $R_2$ is $C_1$-$C_8$ alkyl; and
$Hal_1$ is halogen.

In a preferable embodiment, $R_1$ is $C_1$-$C_{16}$ alkyl, cyclohexyl, cyclopentyl, or phenyl, wherein each group is unsubstituted or substituted by $C_1$-$C_6$ alkyl, $C_1$-$C_6$ alkoxy, or dialkylamino; preferably is phenyl or $C_1$-$C_6$ alkyl, for example, methyl, ethyl, propyl, butyl, amyl or hexyl; more preferably is $C_1$-$C_4$ alkyl, for example, methyl, ethyl, propyl, or butyl; and most preferably is methyl.

In another preferable embodiment, $R_2$ is $C_1$-$C_6$ alkyl, such as methyl, ethyl, propyl, butyl, amyl or hexyl; preferably is $C_1$-$C_4$ alkyl, for example, methyl, ethyl, propyl, or butyl; and more preferably is ethyl.

In yet another preferable embodiment, $Hal_1$ is fluorine, chlorine, bromine or iodine, and preferably is chlorine.

In a preferable embodiment, the compound of formula (II) is dichloromethylphosphine, dichloroethylphosphine, dichloropropylphosphine, dichlorobutylphosphine, dichlorocyclohexylphosphine, dichlorophenylphosphine, dichloro-4-methoxyphenylphosphine or dichloro-4-dimethylaminophenylphosphine.

In another preferable embodiment, the alcohol of formula (III) is methanol, ethanol, n-propanol, isopropanol or n-butanol, preferably is ethanol, n-propanol, isopropanol or n-butanol, more preferably is n-butanol or ethanol, and most preferably is ethanol.

In yet another preferable embodiment, the molar ratio of the compound of formula (II) to the alcohol of formula (III) is 1:(0.1-1.9), preferably 1:(0.5-1.5), and more preferably 1:(0.9-1.1). For example, the molar ratio of the compound of formula (II) to the alcohol of formula (III) is 1:0.2, 1:0.3, 1:0.4, 1:0.5, 1:0.6, 1:0.7, 1:0.8, 1:0.9, 1:1, 1:1.1, 1:1.2, 1:1.3; 1:1.4, 1:1.5, 1:1.6, 1:1.7, 1:1.8 or 1:1.9, and most preferably is 1:1.

In another preferable embodiment, the reaction is conducted at a temperature ranging from −35° C. to 50° C., preferably from −30° C. to 30° C., more preferably from −20° C. to 0° C., and most preferably −10° C. to 0° C. For example, the reaction temperature may be −35° C., −34° C., −33° C., −32° C., −31° C., −30° C., −29° C., −28° C., −27° C., −26° C., −25° C., −24° C., −23° C., −22° C., −21° C., −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C. or 50° C.

In another preferable embodiment, the reaction is conducted in a continuous flow reactor selecting from a microchannel reactor, a tube reactor, a tubular packed reactor, a stirred tank reactor or any combination thereof. For example, the reactor consists of one or more microchannel continuous flow reactors, or the reactor consists of one or more microchannel continuous flow reactors and one or more tube reactors.

In yet another preferable embodiment, the temperature within the continuous flow reactors ranges from −35° C. to 50° C., preferably from −30° C. to 30° C., more preferably from −20° C. to 30° C., and most preferably −10° C. to 30° C. For example, the temperature may be −35° C., −34° C., −33° C., −32° C., −31° C., −30° C., −29° C., −28° C., −27°

C., −26° C., −25° C., −24° C., −23° C., −22° C., −21° C., −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C. or 50° C.

The flow rates of the compound of formula (II) and the alcohol of formula (III) are not limited, and can vary with the dimensions of the devices.

In a further preferable embodiment, where the continuous flow reactor consists of microchannel reactors, the residence time of the compound of formula (II) and the alcohol of formula (III) in the continuous flow reactor is in the range of 0.1 seconds to 300 seconds, preferably 1 second to 30 seconds, and more preferably 15 seconds to 28 seconds. For example, the residence time may be 0.1 seconds, 0.2 seconds, 0.5 seconds, 0.8 seconds, 1 seconds, 1.2 seconds, 1.4 seconds, 1.6 seconds, 1.8 seconds, 2 seconds, 2.5 seconds, 3 seconds, 4 seconds, 5 seconds, 6 seconds, 7 seconds, 8 seconds, 9 seconds, 10 seconds, 11 seconds, 12 seconds, 13 seconds, 14 seconds, 15 seconds, 16 seconds, 17 seconds, 18 seconds, 19 seconds, 20 seconds, 21 seconds, 22 seconds, 23 seconds, 24 seconds, 25 seconds, 26 seconds, 27 seconds, 28 seconds, 29 seconds, 30 seconds, 31 seconds, 35 seconds, 40 seconds, 45 seconds, 50 seconds, 55 seconds, 60 seconds, 65 seconds, 70 seconds, 75 seconds, 80 seconds, 85 seconds, 90 seconds, 95 seconds, 100 seconds, 105 seconds, 110 seconds, 115 seconds, 120 seconds, 125 seconds, 130 seconds, 135 seconds, 140 seconds, 145 seconds, 150 seconds, 155 seconds, 160 seconds, 165 seconds, 170 seconds, 175 seconds, 180 seconds, 185 seconds, 190 seconds, 195 seconds, 200 seconds, 205 seconds, 210 seconds, 215 seconds, 220 seconds, 225 seconds, 230 seconds, 235 seconds, 240 seconds, 245 seconds, 250 seconds, 255 seconds, 260 seconds, 265 seconds, 270 seconds, 275 seconds, 280 seconds, 285 seconds, 290 seconds, 295 seconds or 300 seconds.

In another preferable embodiment, the reaction is conducted in a tank reactor.

In a further preferable embodiment, the tank reactor is a continuous tank reactor.

In yet another preferable embodiment, the temperature within the tank reactor ranges from −35° C. to 50° C., preferably from −30° C. to 30° C., more preferably from −20° C. to 30° C., and most preferably −18° C. to 30° C. For example, the temperature may be −35° C., −34° C., −33° C., −32° C., −31° C., −30° C., −29° C., −28° C., −27° C., −26° C., −25° C., −24° C., −23° C., −22° C., −21° C., −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C. or 50° C.

A Process for Preparing Glufosinate or its Analogue of Formula (IV)

The present invention further provides a process for preparing glufosinate or its analogue of formula (IV), comprising:

a) reacting a compound of formula (II), an alcohol of formula (III) and a compound of formula (V), b) subjecting products obtained from the above reaction to a hydrolysis, to obtain the glufosinate or its analogue of formula (IV), wherein $R_1$, $R_2$ and $Hal_1$ are each as defined in the process for preparing the compound of formula (I); $Hal^2$ is halogen, PG is hydrogen or an amino-protecting group, wherein when PG is the amino-protecting group, the process further comprises removing the amino-protecting group, and X is —$OR_3$ or —$NR_3R_4$, wherein $R_3$ is $C_1$-$C_{16}$ alkyl, $C_6$-$C_{16}$ aryl, $C_3$-$C_{16}$ cycloalkyl, $C_7$-$C_{16}$ aralkyl or $C_7$-$C_{16}$ alkaryl, wherein the groups are each unsubstituted or substituted by $C_1$-$C_6$ alkyl; and $R_4$ is hydrogen or as defined for $R_3$.

Regarding $R_1$, $R_2$ and $Hal_1$, all the groups, preferable groups, more preferable groups and most preferable groups defined in the preceding process directed to the compound of formula (I) apply to the process for preparing glufosinate or its analogue of formula (IV) in the present invention.

In the present invention, the sequence of feeding the compound of formula (II), the alcohol of formula (III) and the compound of formula (V) does not affect the effect achieved by the embodiments of the present invention when the three substances are reacted. In a preferable embodiment, the step a) can be carried out by: mixing the compound of formula (II), the alcohol of formula (III), the compound of formula (V) and a solvent together; or mixing the compound of formula (II) and the alcohol of formula (III), and then mixing the resultant product with the compound of formula (V), preferably without requiring other solvent; or mixing the compound of formula (II) and the compound of formula (V), and then mixing the resultant product with the alcohol of formula (III).

In a further preferable embodiment, when all the reactions of step a) are carried out in microchannel reactors, the reactions of step a) are conducted at a reaction temperature ranging from −30° C. to 50° C., preferably from −10° C. to 30° C., and more preferably from −5° C. to 30° C.; or when the reactions of step a) are carried out in reactors consisting of a microchannel reactor and a tube reactor, or in a tank reactor, the reactions of step a) are conducted at a reaction temperature ranging from −30° C. to 50° C., preferably from −20° C. to 10° C., and more preferably from −15° C. to 5° C. For example, the reaction temperature may be −30° C., −29° C., −28° C., −27° C., −26° C., −25° C., −24° C., −23° C., −22° C., −21° C., −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C. or 50° C.

In yet another preferable embodiment, the molar ratio of the compound of formula (II), the alcohol of formula (III) and the compound of formula (V) is 1:(0.1-1.9):(0.1-2), preferably 1:(0.5-1.5):(0.5-1), more preferably 1:(0.9-1.1):(0.7-1), and most preferably 1:1:(0.7-0.9). For example, the molar ratio of the compound of formula (II), the alcohol of formula (III) and the compound of formula (V) is 1:0.1:0.1, 1:0.1:0.2, 1:0.1:0.3, 1:0.1:0.4, 1:0.1:0.5, 1:0.1:0.6, 1:0.1:0.7, 1:0.1:0.8, 1:0.1:0.9, 1:0.1:1, 1:0.1:1.1, 1:0.1:1.2, 1:0.1:1.3, 1:0.1:1.4, 1:0.1:1.5, 1:0.1:1.6, 1:0.1:1.7, 1:0.1:1.8, 1:0.1:1.9, 1:0.1:2, 1:0.2:0.1, 1:0.2:0.2, 1:0.2:0.3, 1:0.2:0.4, 1:0.2:0.5, 1:0.2:0.6, 1:0.2:0.7, 1:0.2:0.8, 1:0.2:0.9, 1:0.2:1, 1:0.2:1.1, 1:0.2:1.2, 1:0.2:1.3, 1:0.2:1.4, 1:0.2:1.5, 1:0.2:1.6, 1:0.2:1.7, 1:0.2:1.8, 1:0.2:1.9, 1:0.2:2, 1:0.3:0.1, 1:0.3:0.2, 1:0.3:0.3, 1:0.3:0.4, 1:0.3:0.5, 1:0.3:0.6, 1:0.3:0.7, 1:0.3:0.8, 1:0.3:0.9, 1:0.3:1, 1:0.3:1.1, 1:0.3:1.2, 1:0.3:1.3, 1:0.3:1.4, 1:0.3:1.5, 1:0.3:1.6, 1:0.3:1.7, 1:0.3:1.8, 1:0.3:1.9, 1:0.3:2, 1:0.4:0.1, 1:0.4:0.2, 1:0.4:0.3, 1:0.4:0.4, 1:0.4:0.5, 1:0.4:0.6, 1:0.4:0.7, 1:0.4:0.8, 1:0.4:0.9, 1:0.4:1, 1:0.4:1.1, 1:0.4:1.2, 1:0.4:1.3, 1:0.4:1.4, 1:0.4:1.5, 1:0.4:1.6, 1:0.4:1.7, 1:0.4:1.8, 1:0.4:1.9, 1:0.4:2, 1:0.5:0.1, 1:0.5:0.2, 1:0.5:0.3, 1:0.5:0.4, 1:0.5:0.5, 1:0.5:0.6, 1:0.5:0.7, 1:0.5:0.8, 1:0.5:0.9, 1:0.5:1, 1:0.5:1.1, 1:0.5:1.2, 1:0.5:1.3, 1:0.5:1.4, 1:0.5:1.5, 1:0.5:1.6, 1:0.5:1.7, 1:0.5:1.8, 1:0.5:1.9, 1:0.5:2, 1:0.6:0.1, 1:0.6:0.2, 1:0.6:0.3, 1:0.6:0.4, 1:0.6:0.5, 1:0.6:0.6, 1:0.6:0.7, 1:0.6:0.8, 1:0.6:0.9, 1:0.6:1, 1:0.6:1.1, 1:0.6:1.2, 1:0.6:1.3, 1:0.6:1.4, 1:0.6:1.5, 1:0.6:1.6, 1:0.6:1.7, 1:0.6:1.8, 1:0.6:1.9, 1:0.6:2, 1:0.7:0.1, 1:0.7:0.2, 1:0.7:0.3, 1:0.7:0.4, 1:0.7:0.5, 1:0.7:0.6, 1:0.7:0.7, 1:0.7:0.8, 1:0.7:0.9, 1:0.7:1, 1:0.7:1.1, 1:0.7:1.2, 1:0.7:1.3, 1:0.7:1.4, 1:0.7:1.5, 1:0.7:1.6, 1:0.7:1.7, 1:0.7:1.8, 1:0.7:1.9, 1:0.7:2, 1:0.8:0.1, 1:0.8:0.2, 1:0.8:0.3, 1:0.8:0.4, 1:0.8:0.5, 1:0.8:0.6, 1:0.8:0.7, 1:0.8:0.8, 1:0.8:0.9, 1:0.8:1, 1:0.8:1.1, 1:0.8:1.2, 1:0.8:1.3, 1:0.8:1.4, 1:0.8:1.5, 1:0.8:1.6, 1:0.8:1.7, 1:0.8:1.8, 1:0.8:1.9, 1:0.8:2, 1:0.9:0.1, 1:0.9:0.2, 1:0.9:0.3, 1:0.9:0.4, 1:0.9:0.5, 1:0.9:0.6, 1:0.9:0.7, 1:0.9:0.8, 1:0.9:0.9, 1:0.9:1, 1:0.9:1.1, 1:0.9:1.2, 1:0.9:1.3, 1:0.9:1.4, 1:0.9:1.5, 1:0.9:1.6, 1:0.9:1.7, 1:0.9:1.8, 1:0.9:1.9, 1:0.9:2, 1:1:0.1, 1:1:0.2, 1:1:0.3, 1:1:0.4, 1:1:0.5, 1:1:0.6, 1:1:0.7, 1:1:0.8, 1:1:0.9, 1:1:1, 1:1:1.1, 1:1:1.2, 1:1:1.3, 1:1:1.4, 1:1:1.5, 1:1:1.6, 1:1:1.7, 1:1:1.8, 1:1:1.9, 1:1:2, 1:1.1:0.1, 1:1.1:0.2, 1:1.1:0.3, 1:1.1:0.4, 1:1.1:0.5, 1:1.1:0.6, 1:1.1:0.7, 1:1.1:0.8, 1:1.1:0.9, 1:1.1:1, 1:1.1:1.1, 1:1.1:1.2, 1:1.1:1.3, 1:1.1:1.4, 1:1.1:1.5, 1:1.1:1.6, 1:1.1:1.7, 1:1.1:1.8, 1:1.1:1.9, 1:1.1:2, 1:1.2:0.1, 1:1.2:0.2, 1:1.2:0.3, 1:1.2:0.4, 1:1.2:0.5, 1:1.2:0.6, 1:1.2:0.7, 1:1.2:0.8, 1:1.2:0.9, 1:1.2:1, 1:1.2:1.1, 1:1.2:1.2, 1:1.2:1.3, 1:1.2:1.4, 1:1.2:1.5, 1:1.2:1.6, 1:1.2:1.7, 1:1.2:1.8, 1:1.2:1.9, 1:1.2:2, 1:1.3:0.1, 1:1.3:0.2, 1:1.3:0.3, 1:1.3:0.4, 1:1.3:0.5, 1:1.3:0.6, 1:1.3:0.7, 1:1.3:0.8, 1:1.3:0.9, 1:1.3:1, 1:1.3:1.1, 1:1.3:1.2, 1:1.3:1.3, 1:1.3:1.4, 1:1.3:1.5, 1:1.3:1.6, 1:1.3:1.7, 1:1.3:1.8, 1:1.3:1.9, 1:1.3:2, 1:1.4:0.1, 1:1.4:0.2, 1:1.4:0.3, 1:1.4:0.4, 1:1.4:0.5, 1:1.4:0.6, 1:1.4:0.7, 1:1.4:0.8, 1:1.4:0.9, 1:1.4:1, 1:1.4:1.1, 1:1.4:1.2, 1:1.4:1.3, 1:1.4:1.4, 1:1.4:1.5, 1:1.4:1.6, 1:1.4:1.7, 1:1.4:1.8, 1:1.4:1.9, 1:1.4:2, 1:1.5:0.1, 1:1.5:0.2, 1:1.5:0.3, 1:1.5:0.4, 1:1.5:0.5, 1:1.5:0.6, 1:1.5:0.7, 1:1.5:0.8, 1:1.5:0.9, 1:1.5:1, 1:1.5:1.1, 1:1.5:1.2, 1:1.5:1.3, 1:1.5:1.4, 1:1.5:1.5, 1:1.5:1.6, 1:1.5:1.7, 1:1.5:1.8, 1:1.5:1.9, 1:1.5:2, 1:1.6:0.1, 1:1.6:0.2, 1:1.6:0.3, 1:1.6:0.4, 1:1.6:0.5, 1:1.6:0.6, 1:1.6:0.7, 1:1.6:0.8, 1:1.6:0.9, 1:1.6:1, 1:1.6:1.1, 1:1.6:1.2, 1:1.6:1.3, 1:1.6:1.4, 1:1.6:1.5, 1:1.6:1.6, 1:1.6:1.7, 1:1.6:1.8, 1:1.6:1.9, 1:1.6:2, 1:1.7:0.1, 1:1.7:0.2, 1:1.7:0.3, 1:1.7:0.4, 1:1.7:0.5, 1:1.7:0.6, 1:1.7:0.7, 1:1.7:0.8, 1:1.7:0.9, 1:1.7:1, 1:1.7:1.1, 1:1.7:1.2, 1:1.7:1.3, 1:1.7:1.4, 1:1.7:1.5, 1:1.7:1.6, 1:1.7:1.7, 1:1.7:1.8, 1:1.7:1.9, 1:1.7:2, 1:1.8:0.1, 1:1.8:0.2, 1:1.8:0.3, 1:1.8:0.4, 1:1.8:0.5, 1:1.8:0.6, 1:1.8:0.7, 1:1.8:0.8, 1:1.8:0.9, 1:1.8:1, 1:1.8:1.1, 1:1.8:2, 1:1.9:0.1, 1:1.9:0.2, 1:1.9:0.3, 1:1.9:0.4, 1:1.9:0.5, 1:1.9:0.6, 1:1.9:0.7, 1:1.9:0.8, 1:1.9:0.9, 1:1.9:1, 1:1.9:1.1, 1:1.9:1.2, 1:1.9:1.3, 1:1.9:1.4, 1:1.9:1.5, 1:1.9:1.6, 1:1.9:1.7, 1:1.9:1.8, 1:1.9:1.9, 1:1.9:2, 1.1:1:1.1, 1.2:1.2:1 or 1.3:1.3:1.

In another preferable embodiment, $Hal^2$ is fluorine, chlorine, bromine or iodine, and preferably is chlorine.

In a further preferable embodiment, PG is H, —C(O)—$R_5$, —$SO_2$—$R_6$, —CHC(O)O—$R_7$ or —C(O)$OR_8$, wherein $R_5$ is $C_6$-$C_{16}$ aryl, $C_7$-$C_{16}$ aralkyl or $C_7$-$C_{16}$ alkaryl, preferably is $C_6$-$C_{12}$ aryl, $C_7$-$C_{13}$ aralkyl or $C_7$-$C_{13}$ alkaryl, more preferably is phenyl, tolyl, benzyl or phenylethyl, and most preferably is phenyl; $R_6$ is $C_6$-$C_{16}$ aryl, $C_7$-$C_{16}$ aralkyl or $C_7$-$C_{16}$ alkaryl, preferably is $C_6$-$C_{12}$ aryl, $C_7$-$C_{13}$ aralkyl or $C_7$-$C_{13}$ alkaryl, more preferably is phenyl, tolyl, benzyl or phenylethyl, and most preferably is tolyl; and $R_7$ and $R_8$ are each independently $C_1$-$C_{16}$ alkyl, $C_6$-$C_{16}$ aryl, $C_3$-$C_{16}$ cycloalkyl, $C_7$-$C_{16}$ aralkyl or $C_7$-$C_{16}$ alkaryl, preferably are $C_1$-$C_8$ alkyl, $C_6$-$C_{12}$ aryl, $C_3$-$C_{10}$ cycloalkyl, $C_7$-$C_{12}$ aralkyl or $C_7$-$C_{12}$ alkaryl, more preferably are methyl, ethyl, propyl, butyl, phenyl, benzyl, phenethyl, tolyl, ethylphenyl, cyclopropyl, cyclobutyl or cyclopentyl, and most preferably are methyl, ethyl, or isomers of propyl or butyl.

In a further preferable embodiment, X is —$OR_3$, wherein $R_3$ is $C_1$-$C_8$ alkyl or $C_7$-$C_{10}$ aralkyl, preferably is $C_1$-$C_6$ alkyl or $C_7$-$C_9$ aralkyl, and more preferably is methyl, ethyl, propyl, isopropyl, butyl, isobutyl or benzyl.

In another preferable embodiment, X is —$NR_3R_4$, wherein $R_3$ is $C_1$-$C_8$ alkyl or $C_7$-$C_{10}$ aralkyl, preferably is $C_1$-$C_6$ alkyl or $C_7$-$C_9$ aralkyl, more preferably is methyl, ethyl, propyl, isopropyl, butyl, isobutyl or benzyl, and particularly preferably is methyl, propyl, isopropyl or butyl; and $R_4$ is H or as defined for $R_3$, and preferably is H or methyl.

In a preferable embodiment, the hydrolysis is acid hydrolysis or base hydrolysis, wherein the acid hydrolysis is conducted preferably with an inorganic or organic acid, and the base hydrolysis is conducted preferably with an inorganic or organic base, wherein the inorganic acid is preferably hydrochloric acid or sulfuric acid.

In a further preferable embodiment, the step a) is conducted in the absence of a solvent or in the presence of an inert solvent, wherein the inert solvent is preferably any one or more than one of benzene solvents, amide solvents, hydrocarbon solvents, halohydrocarbon solvents, sulfone or sulfoxide solvents, ether solvents or ester solvents; and preferably, the inert solvent is selected from any one or more than one of chlorobenzene, trimethylbenzene, 1,4-dioxane, 1,2-dichloroethane, dimethyl sulfoxide, N-methylpyrrolidone, N,N-dimethylformamide, petroleum ether, n-heptane, tetrahydrofuran, methyltetrahydrofuran, benzene, toluene, ethyl acetate, and butyl acetate.

In a preferable embodiment, the base is added at the beginning of, during and or after the reaction of step a), and preferably after the reaction of step a), wherein the base is preferably an organic base or ammonia, and more preferably is ammonia.

In another preferable embodiment, the organic base is an organic amine, for example, triethylamine, pyridine or pyridine derivatives having 1 to 3 substituents attached to one or more carbon atoms of the heterocycle, or piperidine or piperidine derivatives having 1 to 3 substituents attached to one or more carbon atoms of the heterocycle.

In yet another preferable embodiment, the step a) is carried out by: (i) simultaneously entering the compound of formula (II), the alcohol of formula (III) and the compound of formula (V) into a first reactor to react with each other in the presence of a solvent, and then entering the resultant product and a base, preferably ammonia gas, into a second reactor together; or (ii) simultaneously entering the compound of formula (II) and the alcohol of formula (III) into a first reactor to react with each other in the presence of a solvent or in the absence of other solvent, then entering the resultant product and the compound of formula (V) into a second reactor, and finally entering the resultant product and a base, preferably ammonia gas, into a third reactor together to react with each other; or (iii) simultaneously entering the compound of formula (II) and the compound of formula (V) into a first reactor to react with each other in the presence of a solvent or in the absence of other solvent, then entering the resultant product and the alcohol of formula (III) into a second reactor, and finally entering the resultant product and a base, preferably ammonia gas, into a third reactor together to react with each other; or (iv) simultaneously entering the compound of formula (II) and the alcohol of formula (III) into a first reactor to react with each other in the presence of a solvent or in the absence of other solvent, and then entering the resultant product, the compound of formula (V) and a base, preferably ammonia gas, into a second reactor together to react with each other.

In a preferable embodiment, the first reactor, the second reactor and/or the third reactor are each independently one or more reactors.

In another preferable embodiment, the first reactor, the second reactor and/or the third reactor are each independently selected from a microchannel reactor, a tube reactor, a tubular packed reactor, a stirred tank reactor or any combinations thereof. For example, the first reactor, the second reactor and/or the third reactor each independently consist of one or more microchannel continuous flow reactors; or each independently consist of one or more microchannel continuous flow reactors and one or more tube reactors.

In a further preferable embodiment, the step a) is carried out by: (i) simultaneously entering the compound of formula (II), the alcohol of formula (III) and the compound of formula (V) into a first microchannel reactor to react with each other in the presence of a solvent, and then entering the resultant product and a base, preferably ammonia gas, into a second microchannel reactor together; or (ii) simultaneously entering the compound of formula (II) and the alcohol of formula (III) into a first microchannel reactor to react with each other in the presence of a solvent or in the absence of solvent, then entering the resultant product and the compound of formula (V) into a second microchannel reactor, and finally entering the resultant product and a base, preferably ammonia gas, into a third microchannel reactor together to react with each other; or (iii) simultaneously entering the compound of formula (II) and the compound of formula (V) into a first microchannel reactor to react with each other in the presence of a solvent or in the absence of a solvent, then entering the resultant product and the alcohol of formula (III) into a second microchannel reactor, and finally entering the resultant product and a base, preferably ammonia gas, into a third microchannel reactor together to react with each other; or (iv) simultaneously entering the compound of formula (II) and the alcohol of formula (III) into a first microchannel reactor to react with each other in the presence of a solvent or in the absence of a solvent, and then entering the resultant product, the compound of formula (V) and a base, preferably ammonia gas, into a tube reactor together to react with each other.

In yet another preferable embodiment, in embodiment (i), the temperatures in the first microchannel reactor and/or the second microchannel reactor each range independently from $-30°$ C. to $50°$ C., preferably from $-10°$ C. to $30°$ C., and more preferably from $-5°$ C. to $30°$ C., wherein the above temperatures are the same or different. For example, the reaction temperature may be $-30°$ C., $-29°$ C., $-28°$ C., $-27°$ C., $-26°$ C., $-25°$ C., $-24°$ C., $-23°$ C., $-22°$ C., $-21°$ C., $-20°$ C., $-19°$ C., $-18°$ C., $-17°$ C., $-16°$ C., $-15°$ C., $-14°$ C., $-13°$ C., $-12°$ C., $-11°$ C., $-10°$ C., $-9°$ C., $-8°$ C., $-7°$ C., $-6°$ C., $-5°$ C., $-4°$ C., $-3°$ C., $-2°$ C., $-1°$ C., $0°$ C., $1°$ C., $2°$ C., $3°$ C., $4°$ C., $5°$ C., $6°$ C., $7°$ C., $8°$ C., $9°$ C., $10°$ C., $11°$ C., $12°$ C., $13°$ C., $14°$ C., $15°$ C., $16°$ C., $17°$ C., $18°$ C., $19°$ C., $20°$ C., $21°$ C., $22°$ C., $23°$ C., $24°$ C., $25°$ C., $26°$ C., $27°$ C., $28°$ C., $29°$ C. or $30°$ C.

In embodiment (ii), the temperatures in the first microchannel reactor, the second microchannel reactor and/or the third microchannel reactor each range independently from $-30°$ C. to $50°$ C., preferably from $-10°$ C. to $30°$ C., and more preferably from $-5°$ C. to $30°$ C., wherein the above temperatures are the same or different. For example, the reaction temperature may be $-30°$ C., $-29°$ C., $-28°$ C., $-27°$ C., $-26°$ C., $-25°$ C., $-24°$ C., $-23°$ C., $-22°$ C., $-21°$ C., $-20°$ C., $-19°$ C., $-18°$ C., $-17°$ C., $-16°$ C., $-15°$ C., $-14°$ C., $-13°$ C., $-12°$ C., $-11°$ C., $-10°$ C., $-9°$ C., $-8°$ C., $-7°$ C., $-6°$ C., $-5°$ C., $-4°$ C., $-3°$ C., $-2°$ C., $-1°$ C., $0°$ C., $1°$ C., $2°$ C., $3°$ C., $4°$ C., $5°$ C., $6°$ C., $7°$ C., $8°$ C., $9°$ C., $10°$ C., $11°$ C., $12°$ C., $13°$ C., $14°$ C., $15°$ C., $16°$ C., $17°$ C., $18°$ C., $19°$ C., $20°$ C., $21°$ C., $22°$ C., $23°$ C., $24°$ C., $25°$ C., $26°$ C., $27°$ C., $28°$ C., $29°$ C. or $30°$ C.

In embodiment (iii), the temperatures in the first microchannel reactor, the second microchannel reactor and/or the third microchannel reactor each range independently from $-30°$ C. to $50°$ C., preferably from $-10°$ C. to $30°$ C., and more preferably from $-5°$ C. to $30°$ C., wherein the above temperatures are the same or different.

In embodiment (iv), the temperature in the first microchannel reactor ranges from $-30°$ C. to $50°$ C., preferably from $-25°$ C. to $5°$ C., and more preferably from $-20°$ C. to $-10°$ C.; and/or the temperature in the tube reactor is from $-30°$ C. to $50°$ C., preferably from $-25°$ C. to $10°$ C., and more preferably from $-20°$ C. to $5°$ C.

In a preferable embodiment, in the step a), when the reactors merely consist of microchannel reactors, the total residence time in all the reactors is in the range of 0.1 seconds to 300 seconds, preferably 1 second to 50 seconds, and more preferably 10 seconds to 40 seconds; or when the reactors consist of a microchannel reactor and a tube reactor, the total residence time in all the reactors is in the range of 1 minute to 20 minutes, preferably 5 minutes to 18 minutes, and more preferably 9 minutes to 14 minutes. For example, the residence time may be 0.1 seconds, 0.2 seconds, 0.5 seconds, 0.8 seconds, 1 seconds, 1.2 seconds, 1.4 seconds, 1.6 seconds, 1.8 seconds, 2 seconds, 2.5 seconds, 3 seconds, 4 seconds, 5 seconds, 6 seconds, 7 seconds, 8 seconds, 9 seconds, 10 seconds, 11 seconds, 12 seconds, 13 seconds, 14 seconds, 15 seconds, 16 seconds, 17 seconds, 18 seconds, 19 seconds, 20 seconds, 21 seconds, 22 seconds, 23 seconds, 24 seconds, 25 seconds, 26 seconds, 27 seconds, 28 seconds, 29 seconds, 30 seconds, 31 seconds, 35 seconds, 40 seconds, 45 seconds, 50 seconds, 55 seconds, 60 seconds, 65 seconds, 70 seconds, 75 seconds, 80 seconds, 85 seconds, 90 seconds, 95 seconds, 100 seconds, 105 seconds, 110 seconds, 115 seconds, 120 seconds, 125 seconds, 130 seconds, 135 seconds, 140 seconds, 145 seconds, 150 seconds, 155 seconds, 160 seconds, 165 seconds, 170 seconds, 175 seconds, 180 seconds, 185 seconds, 190 seconds, 195 seconds, 200 seconds, 205 seconds, 210 seconds, 215 seconds, 220 seconds, 225 seconds, 230 seconds, 235 seconds, 240 seconds, 245 seconds, 250 seconds, 255 seconds, 260 seconds, 265 seconds, 270 seconds, 275 seconds, 280 seconds, 285 seconds, 290 seconds, 295 seconds or 300 seconds.

In a further preferable embodiment, the step b) is conducted by: raising the temperature of the reaction product obtained from step a) to be in a range of 30° C. to 130° C., preferably 60° C. to 120° C., and more preferably 90° C. to 100° C. for 1 to 24 hours, preferably 2 to 10 hours, and more preferably 5 to 8 hours; and then hydrolyzing the products with an acid, preferably hydrochloric acid, at a temperature in the range of 50° C. to 120° C., preferably 80° C. to 120° C., and more preferably 100° C. to 110° C. For example, the reaction product of the step a) may be kept at a temperature of 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C. or 130° C. For example, the reaction product of the step a) may be kept at the temperature for 1 hour, 1.5 hours, 2 hours, 2.5 hours, 3 hours, 3.5 hours, 4 hours, 4.5 hours, 5 hours, 5.5 hours, 6 hours, 6.5 hours, 7 hours, 7.5 hours, 8 hours, 8.5 hours, 9 hours, 9.5 hours, 10 hours, 10.5 hours, 11 hours, 11.5 hours, 12 hours, 12.5 hours, 13 hours, 13.5 hours, 14 hours, 14.5 hours, 15 hours, 15.5 hours, 16 hours, 16.5 hours, 17 hours, 17.5 hours, 18 hours, 18.5 hours, 19 hours, 19.5 hours, 20 hours, 20.5 hours, 21 hours, 21.5 hours, 22 hours, 22.5 hours, 23 hours, 23.5 hours or 24 hours. For example, the hydrolysis temperature may be 50° C., 55° C., 60° C., 65° C., 70° C., 75° C., 80° C., 85° C., 90° C., 95° C., 100° C., 105° C., 110° C., 115° C. or 120° C.

A Process for Preparing Glufosinate or its Analogues of Formula (IV)

The present invention further provides a process for preparing glufosinate or its analogue of formula (IV), comprising:

(IV)

a) feeding a compound of formula (II), an alcohol of formula (III) and a compound of formula (V) into a reactor to obtain a mixture stream, b) reacting the mixture stream at a temperature ranging from −30° C. to 50° C., preferably from −10° C. to 30° C., and more preferably from −5° C. to 5° C., c) subjecting products obtained from step b) to a hydrolysis, to obtain the glufosinate or its analogue of compound (IV), wherein $R_1$, $R_2$ and $Hal_1$ are as defined in the process for preparing the compound of formula (I);

$Hal^2$ is halogen,

PG is hydrogen or an amino-protecting group, wherein when PG is the amino-protecting group, the process further comprises removing the amino-protecting group, and X is —$OR_3$ or —$NR_3R_4$, wherein $R_3$ is $C_1$-$C_{16}$ alkyl, $C_6$-$C_{16}$ aryl, $C_3$-$C_{16}$ cycloalkyl, $C_7$-$C_{16}$ aralkyl or $C_7$-$C_{16}$ alkaryl, wherein the groups are each unsubstituted or substituted by $C_1$-$C_6$ alkyl; and $R_4$ is hydrogen or as defined for $R_3$.

Regarding $R_1$, $R_2$ and $Hal_1$, all the groups, preferable groups, more preferable groups and most preferable groups defined in the preceding process directed to the compound of formula (I) apply to the process for preparing glufosinate or its analogue of formula (IV) in the present invention.

In the present invention, "feeding a compound of formula (II), an alcohol of formula (III) and a compound of formula (V) into a reactor" covers feeding the three substances in any sequence, and feeding of any two substances can either be conducted simultaneously or at a time interval, all of which does not affect the effect achieved by the embodiments of the present invention. In a preferable embodiment, the step a) can be carried out by: mixing the compound of formula (II), the alcohol of formula (III), the compound of formula (V) and a solvent together; or mixing the compound of formula (II) and the alcohol of formula (III), and then mixing the resultant product with the compound of formula (V), preferably without requiring other solvent; or mixing the compound of formula (II) with the compound of formula (V), and then mixing the resultant product with the alcohol of formula (III).

In a further preferable embodiment, when all the reactions of step a) are carried out in microchannel reactors, the reactions of step a) are conducted at a reaction temperature ranging from −30° C. to 50° C., preferably from −10° C. to 30° C., and more preferably from −5° C. to 30° C.; or when the reactions of step a) are carried out in reactors consisting of a microchannel reactor and a tube reactor, or in a tank reactor, the reactions of step a) are conducted at a reaction temperature ranging from −30° C. to 50° C., preferably from −20° C. to 10° C., and more preferably from −15° C. to 5° C. For example, the reaction temperature may be −30° C., −29° C., −28° C., −27° C., −26° C., −25° C., −24° C., −23° C., −22° C., −21° C., −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C. or 50° C.

In yet another preferable embodiment, the molar ratio of the compound of formula (II), the alcohol of formula (III) and the compound of formula (V) is 1:(0.1-1.9):(0.1-2), preferably 1:(0.5-1.5):(0.5-1), more preferably 1:(0.9-1.1):(0.7-1), and most preferably 1:1:(0.7-0.9). For example, the molar ratio of the compound of formula (II), the alcohol of formula (III) and the compound of formula (V) is 1:0.1:0.1, 1:0.1:0.2, 1:0.1:0.3, 1:0.1:0.4, 1:0.1:0.5, 1:0.1:0.6, 1:0.1:0.7, 1:0.1:0.8, 1:0.1:0.9, 1:0.1:1, 1:0.1:1.1, 1:0.1:1.2, 1:0.1:1.3, 1:0.1:1.4, 1:0.1:1.5, 1:0.1:1.6, 1:0.1:1.7, 1:0.1:1.8, 1:0.1:1.9, 1:0.1:2, 1:0.2:0.1, 1:0.2:0.2, 1:0.2:0.3, 1:0.2:0.4, 1:0.2:0.5, 1:0.2:0.6, 1:0.2:0.7, 1:0.2:0.8, 1:0.2:0.9, 1:0.2:1, 1:0.2:1.1, 1:0.2:1.2, 1:0.2:1.3, 1:0.2:1.4, 1:0.2:1.5, 1:0.2:1.6, 1:0.2:1.7, 1:0.2:1.8, 1:0.2:1.9, 1:0.2:2, 1:0.3:0.1, 1:0.3:0.2, 1:0.3:0.3, 1:0.3:0.4, 1:0.3:0.5, 1:0.3:0.6, 1:0.3:0.7, 1:0.3:0.8, 1:0.3:0.9, 1:0.3:1, 1:0.3:1.1, 1:0.3:1.2, 1:0.3:1.3, 1:0.3:1.4, 1:0.3:1.5, 1:0.3:1.6, 1:0.3:1.7, 1:0.3:1.8, 1:0.3:1.9, 1:0.3:2, 1:0.4:0.1, 1:0.4:0.2, 1:0.4:0.3, 1:0.4:0.4, 1:0.4:0.5, 1:0.4:0.6, 1:0.4:0.7, 1:0.4:0.8, 1:0.4:0.9, 1:0.4:1, 1:0.4:1.1, 1:0.4:1.2, 1:0.4:1.3, 1:0.4:1.4, 1:0.4:1.5, 1:0.4:1.6, 1:0.4:1.7, 1:0.4:1.8, 1:0.4:1.9, 1:0.4:2, 1:0.5:0.1, 1:0.5:0.2, 1:0.5:0.3, 1:0.5:0.4, 1:0.5:0.5, 1:0.5:0.6, 1:0.5:0.7, 1:0.5:0.8, 1:0.5:0.9, 1:0.5:1, 1:0.5:1.1, 1:0.5:1.2, 1:0.5:1.3, 1:0.5:1.4, 1:0.5:1.5, 1:0.5:1.6, 1:0.5:1.7, 1:0.5:1.8, 1:0.5:1.9, 1:0.5:2, 1:0.6:0.1, 1:0.6:0.2, 1:0.6:0.3, 1:0.6:0.4, 1:0.6:0.5, 1:0.6:0.6, 1:0.6:0.7, 1:0.6:0.8, 1:0.6:0.9, 1:0.6:1, 1:0.6:1.1, 1:0.6:1.2, 1:0.6:1.3, 1:0.6:1.4, 1:0.6:1.5, 1:0.6:1.6, 1:0.6:1.7, 1:0.6:1.8, 1:0.6:1.9, 1:0.6:2, 1:0.7:0.1, 1:0.7:0.2, 1:0.7:0.3, 1:0.7:0.4, 1:0.7:0.5, 1:0.7:0.6, 1:0.7:0.7, 1:0.7:0.8, 1:0.7:0.9, 1:0.7:1, 1:0.7:1.1, 1:0.7:1.2, 1:0.7:1.3, 1:0.7:1.4, 1:0.7:1.5, 1:0.7:1.6, 1:0.7:1.7, 1:0.7:1.8, 1:0.7:1.9, 1:0.7:2, 1:0.8:0.1, 1:0.8:0.2, 1:0.8:0.3, 1:0.8:0.4, 1:0.8:0.5, 1:0.8:0.6, 1:0.8:0.7, 1:0.8:0.8, 1:0.8:0.9, 1:0.8:1, 1:0.8:1.1, 1:0.8:1.2, 1:0.8:1.3, 1:0.8:1.4, 1:0.8:1.5, 1:0.8:1.6, 1:0.8:1.7, 1:0.8:1.8, 1:0.8:1.9, 1:0.8:2, 1:0.9:0.1, 1:0.9:0.2, 1:0.9:0.3, 1:0.9:0.4, 1:0.9:0.5, 1:0.9:0.6, 1:0.9:0.7, 1:0.9:0.8, 1:0.9:0.9, 1:0.9:1, 1:0.9:1.1, 1:0.9:1.2, 1:0.9:1.3, 1:0.9:1.4, 1:0.9:1.5, 1:0.9:1.6, 1:0.9:1.7, 1:0.9:1.8, 1:0.9:1.9, 1:0.9:2, 1:1:0.1, 1:1:0.2, 1:1:0.3, 1:1:0.4, 1:1:0.5, 1:1:0.6, 1:1:0.7, 1:1:0.8, 1:1:0.9, 1:1:1, 1:1:1.1, 1:1:1.2, 1:1:1.3, 1:1:1.4, 1:1:1.5, 1:1:1.6, 1:1:1.7, 1:1:1.8, 1:1:1.9, 1:1:2, 1:1.1:0.1, 1:1.1:0.2, 1:1.1:0.3, 1:1.1:0.4, 1:1.1:0.5, 1:1.1:0.6, 1:1.1:0.7, 1:1.1:0.8, 1:1.1:0.9, 1:1.1:1, 1:1.1:1.1, 1:1.1:1.2, 1:1.1:1.3, 1:1.1:1.4, 1:1.1:1.5, 1:1.1:1.6, 1:1.1:1.7, 1:1.1:1.8, 1:1.1:1.9, 1:1.1:2, 1:1.2:0.1, 1:1.2:0.2, 1:1.2:0.3, 1:1.2:0.4, 1:1.2:0.5, 1:1.2:0.6, 1:1.2:0.7, 1:1.2:0.8, 1:1.2:0.9, 1:1.2:1, 1:1.2:1.1, 1:1.2:1.2, 1:1.2:1.3, 1:1.2:1.4, 1:1.2:1.5, 1:1.2:1.6, 1:1.2:1.7, 1:1.2:1.8, 1:1.2:1.9, 1:1.2:2, 1:1.3:0.1, 1:1.3:0.2, 1:1.3:0.3, 1:1.3:0.4, 1:1.3:0.5, 1:1.3:0.6, 1:1.3:0.7, 1:1.3:0.8, 1:1.3:0.9, 1:1.3:1, 1:1.3:1.1, 1:1.3:1.2, 1:1.3:1.3, 1:1.3:1.4, 1:1.3:1.5, 1:1.3:1.6, 1:1.3:1.7, 1:1.3:1.8, 1:1.3:1.9, 1:1.3:2, 1:1.4:0.1, 1:1.4:0.2, 1:1.4:0.3, 1:1.4:0.4, 1:1.4:0.5, 1:1.4:0.6, 1:1.4:0.7, 1:1.4:0.8, 1:1.4:0.9, 1:1.4:1, 1:1.4:1.1, 1:1.4:1.2, 1:1.4:1.3, 1:1.4:1.4, 1:1.4:1.5, 1:1.4:1.6, 1:1.4:1.7, 1:1.4:1.8, 1:1.4:1.9, 1:1.4:2, 1:1.5:0.1, 1:1.5:0.2, 1:1.5:0.3, 1:1.5:0.4, 1:1.5:0.5, 1:1.5:0.6, 1:1.5:0.7, 1:1.5:0.8, 1:1.5:0.9, 1:1.5:1, 1:1.5:1.1, 1:1.5:1.2, 1:1.5:1.3, 1:1.5:1.4, 1:1.5:1.5, 1:1.5:1.6, 1:1.5:1.7, 1:1.5:1.8, 1:1.5:1.9, 1:1.5:2, 1:1.6:0.1, 1:1.6:0.2, 1:1.6:0.3, 1:1.6:0.4, 1:1.6:0.5, 1:1.6:0.6, 1:1.6:0.7, 1:1.6:0.8, 1:1.6:0.9, 1:1.6:1, 1:1.6:1.1, 1:1.6:1.2, 1:1.6:1.3, 1:1.6:1.4, 1:1.6:1.5, 1:1.6:1.6, 1:1.6:1.7, 1:1.6:1.8, 1:1.6:1.9, 1:1.6:2, 1:1.7:0.1, 1:1.7:0.2, 1:1.7:0.3, 1:1.7:0.4, 1:1.7:0.5, 1:1.7:0.6, 1:1.7:0.7, 1:1.7:0.8, 1:1.7:0.9, 1:1.7:1, 1:1.7:1.1, 1:1.7:1.2, 1:1.7:1.3, 1:1.7:1.4, 1:1.7:1.5, 1:1.7:1.6, 1:1.7:1.7, 1:1.7:1.8, 1:1.7:1.9, 1:1.7:2, 1:1.8:0.1, 1:1.8:0.2, 1:1.8:0.3, 1:1.8:0.4, 1:1.8:0.5, 1:1.8:0.6, 1:1.8:0.7, 1:1.8:0.8, 1:1.8:0.9, 1:1.8:1, 1:1.8:1.1, 1:1.8:2, 1:1.9:0.1, 1:1.9:0.2, 1:1.9:0.3, 1:1.9:0.4, 1:1.9:0.5, 1:1.9:0.6, 1:1.9:0.7, 1:1.9:0.8, 1:1.9:0.9, 1:1.9:1, 1:1.9:1.1, 1:1.9:1.2, 1:1.9:1.3, 1:1.9:1.4, 1:1.9:1.5, 1:1.9:1.6, 1:1.9:1.7, 1:1.9:1.8, 1:1.9:1.9, 1:1.9:2, 1.1:1.1:1, 1.2:1.2:1 or 1.3:1.3:1.

In another preferable embodiment, $Hal^2$ is fluorine, chlorine, bromine or iodine, and preferably is chlorine.

In a further preferable embodiment, PG is H, —C(O)—$R_5$, —$SO_2$—$R_6$, —CHC(O)O—$R_7$ or —C(O)$OR_8$, wherein $R_5$ is $C_6$-$C_{16}$ aryl, $C_7$-$C_{16}$ aralkyl or $C_7$-$C_{16}$ alkaryl, preferably is $C_6$-$C_{12}$ aryl, $C_7$-$C_{13}$ aralkyl or $C_7$-$C_{13}$ alkaryl, more preferably is phenyl, tolyl, benzyl or phenylethyl, and most preferably is phenyl; $R_6$ is $C_6$-$C_{16}$ aryl, $C_7$-$C_{16}$ aralkyl or $C_7$-$C_{16}$ alkaryl, preferably is $C_6$-$C_{12}$ aryl, $C_7$-$C_{13}$ aralkyl or $C_7$-$C_{13}$ alkaryl, more preferably is phenyl, tolyl, benzyl or phenylethyl, and most preferably is tolyl; and $R_7$ and $R_8$ are each independently $C_1$-$C_{16}$ alkyl, $C_6$-$C_{16}$ aryl, $C_3$-$C_{16}$ cycloalkyl, $C_7$-$C_{16}$ aralkyl or $C_7$-$C_{16}$ alkaryl, preferably are $C_1$-$C_8$ alkyl, $C_6$-$C_{12}$ aryl, $C_3$-$C_{10}$ cycloalkyl, $C_7$-$C_{12}$ aralkyl or $C_7$-$C_{12}$ alkaryl, more preferably are methyl, ethyl, propyl, butyl, phenyl, benzyl, phenethyl, tolyl, ethylphenyl, cyclopropyl, cyclobutyl or cyclopentyl, and most preferably are methyl, ethyl, or all the isomers of propyl or butyl.

In a further preferable embodiment, X is —$OR_3$, wherein $R_3$ is $C_1$-$C_8$ alkyl or $C_7$-$C_{10}$ aralkyl, preferably is $C_1$-$C_6$ alkyl or $C_7$-$C_9$ aralkyl, and more preferably is methyl, ethyl, propyl, isopropyl, butyl, isobutyl or benzyl.

In another preferable embodiment, X is —$NR_3R_4$, wherein $R_3$ is $C_1$-$C_8$ alkyl or $C_7$-$C_{10}$ aralkyl, preferably is $C_1$-$C_6$ alkyl or $C_7$-$C_9$ aralkyl, more preferably is methyl, ethyl, propyl, isopropyl, butyl, isobutyl or benzyl, and particularly preferably is methyl, propyl, isopropyl or butyl; and $R_4$ is H or as defined for $R_3$, and preferably is H or methyl.

In a preferable embodiment, the hydrolysis is acid hydrolysis or base hydrolysis, wherein the acid hydrolysis is conducted preferably with an inorganic or organic acid, and the base hydrolysis is conducted preferably with an inorganic or organic base, wherein the inorganic acid is preferably hydrochloric acid or sulfuric acid.

In a further preferable embodiment, the step a) is conducted in the absence of a solvent or in the presence of an inert solvent, wherein the inert solvent is preferably any one or more than one of benzene solvents, amide solvents, hydrocarbon solvents, halohydrocarbon solvents, sulfone or sulfoxide solvents, ether solvents or ester solvents; and preferably, the inert solvent is selected from any one or more than one of chlorobenzene, trimethylbenzene, 1,4-dioxane, 1,2-dichloroethane, dimethyl sulfoxide, N-methylpyrrolidone, N,N-dimethylformamide, petroleum ether, n-heptane, tetrahydrofuran, methyltetrahydrofuran, benzene, toluene, ethyl acetate, and butyl acetate.

In a preferable embodiment, the base is added at the beginning of, during and or after the reaction of step a), and preferably after the reaction of step a), wherein the base is preferably an organic base or ammonia, and more preferably is ammonia.

In another preferable embodiment, the organic base is an organic amine, for example, triethylamine, pyridine or pyridine derivatives having 1 to 3 substituents attached to one or more carbon atoms of the heterocycle, or piperidine or piperidine derivatives having 1 to 3 substituents attached to one or more carbon atoms of the heterocycle.

In yet another preferable embodiment, the step a) is carried out by: (i) simultaneously entering the compound of formula (II), the alcohol of formula (III) and the compound of formula (V) into a first reactor to react with each other in the presence of a solvent, and then entering the resultant product and a base, preferably ammonia gas, into a second reactor together; or (ii) simultaneously entering the compound of formula (II) and the alcohol of formula (III) into a first reactor to react with each other in the presence of a solvent or in the absence of other solvent, then entering the resultant product and the compound of formula (V) into a second reactor, and finally entering the resultant product and a base, preferably ammonia gas, into a third reactor together to react with each other; or (iii) simultaneously entering the compound of formula (II) and the compound of formula (V) into a first reactor to react with each other in the presence of a solvent or in the absence of other solvent, then entering the resultant product and the alcohol of formula (III) into a second reactor, and finally entering the resultant product and a base, preferably ammonia gas, into a third reactor together to react with each other; or (iv) simultaneously entering the compound of formula (II) and the alcohol of formula (III) into a first reactor to react with each other in the presence of a solvent or in the absence of other solvent, and then entering the resultant product, the compound of formula (V) and a base, preferably ammonia gas, into a second reactor together to react with each other.

In a preferable embodiment, the first reactor, the second reactor and/or the third reactor are each independently one or more reactors.

In another preferable embodiment, the first reactor, the second reactor and/or the third reactor are each independently selected from a microchannel reactor, a tube reactor, a tubular packed reactor, a stirred tank reactor or any combinations thereof. For example, the first reactor, the second reactor and/or the third reactor each independently consist of one or more microchannel continuous flow reactors; or each independently consist of one or more microchannel continuous flow reactors and one or more tube reactors.

In a further preferable embodiment, the step a) is carried out by: (i) simultaneously entering the compound of formula (II), the alcohol of formula (III) and the compound of formula (V) into a first microchannel reactor to react with each other in the presence of a solvent, and then entering the resultant product and a base, preferably ammonia gas, into a second microchannel reactor together; or (ii) simultaneously entering the compound of formula (II) and the alcohol of formula (III) into a first microchannel reactor to react with each other in the presence of a solvent or in the absence of solvent, then entering the resultant product and the compound of formula (V) into a second microchannel reactor, and finally entering the resultant product and a base, preferably ammonia gas, into a third microchannel reactor together to react with each other; or (iii) simultaneously entering the compound of formula (II) and the compound of formula (V) into a first microchannel reactor to react with each other in the presence of a solvent or in the absence of a solvent, then entering the resultant product and the alcohol of formula (III) into a second microchannel reactor, and finally entering the resultant product and a base, preferably ammonia gas, into a third microchannel reactor together to react with each other; or (iv) simultaneously entering the compound of formula (II) and the alcohol of formula (III) into a first microchannel reactor to react with each other in the presence of a solvent or in the absence of a solvent, and then entering the resultant product, the compound of formula (V) and a base, preferably ammonia gas, into a tube reactor together to react with each other.

In yet another preferable embodiment, in embodiment (i), the temperatures in the first microchannel reactor and/or the second microchannel reactor each range independently from −30° C. to 50° C., preferably from −10° C. to 30° C., and more preferably from −5° C. to 30° C., wherein the above temperatures are the same or different. For example, the reaction temperature may be −30° C., −29° C., −28° C., −27° C., −26° C., −25° C., −24° C., −23° C., −22° C., −21° C., −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C. or 30° C.

In embodiment (ii), the temperatures in the first microchannel reactor, the second microchannel reactor and/or the third microchannel reactor each range independently from −30° C. to 50° C., preferably from −10° C. to 30° C., and more preferably from −5° C. to 30° C., wherein the above temperatures are the same or different. For example, the reaction temperature may be −30° C., −29° C., −28° C., −27° C., −26° C., −25° C., −24° C., −23° C., −22° C., −21° C., −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18°

C., 19° C., 20° C., 21° C., 22° C., 23° C., 24° C., 25° C., 26° C., 27° C., 28° C., 29° C. or 30° C.

In embodiment (iii), the temperatures in the first microchannel reactor, the second microchannel reactor and/or the third microchannel reactor each range independently from −30° C. to 50° C., preferably from −10° C. to 30° C., and more preferably from −5° C. to 30° C., wherein the above temperatures are the same or different.

In embodiment (iv), the temperature in the first microchannel reactor ranges from −30° C. to 50° C., preferably from −25° C. to 5° C., and more preferably from −20° C. to −10° C.; and/or the temperature in the tube reactor is from −30° C. to 50° C., preferably from −25° C. to 10° C., and more preferably from −20° C. to 5° C.

In a preferable embodiment, in the step a), when the reactors consist of microchannel reactors, the total residence time in all the reactors is in the range of 0.1 seconds to 300 seconds, preferably 1 second to 30 seconds, and more preferably 2 seconds to 8 seconds. For example, the residence time may be 0.1 seconds, 0.2 seconds, 0.5 seconds, 0.8 seconds, 1 seconds, 1.2 seconds, 1.4 seconds, 1.6 seconds, 1.8 seconds, 2 seconds, 2.5 seconds, 3 seconds, 4 seconds, 5 seconds, 6 seconds, 7 seconds, 8 seconds, 9 seconds, 10 seconds, 11 seconds, 12 seconds, 13 seconds, 14 seconds, 15 seconds, 16 seconds, 17 seconds, 18 seconds, 19 seconds, 20 seconds, 21 seconds, 22 seconds, 23 seconds, 24 seconds, 25 seconds, 26 seconds, 27 seconds, 28 seconds, 29 seconds, 30 seconds, 31 seconds, 35 seconds, 40 seconds, 45 seconds, 50 seconds, 55 seconds, 60 seconds, 65 seconds, 70 seconds, 75 seconds, 80 seconds, 85 seconds, 90 seconds, 95 seconds, 100 seconds, 105 seconds, 110 seconds, 115 seconds, 120 seconds, 125 seconds, 130 seconds, 135 seconds, 140 seconds, 145 seconds, 150 seconds, 155 seconds, 160 seconds, 165 seconds, 170 seconds, 175 seconds, 180 seconds, 185 seconds, 190 seconds, 195 seconds, 200 seconds, 205 seconds, 210 seconds, 215 seconds, 220 seconds, 225 seconds, 230 seconds, 235 seconds, 240 seconds, 245 seconds, 250 seconds, 255 seconds, 260 seconds, 265 seconds, 270 seconds, 275 seconds, 280 seconds, 285 seconds, 290 seconds, 295 seconds or 300 seconds.

In a further preferable embodiment, the step b) is conducted by: raising the temperature of the reaction product obtained from step a) to be in a range of 30° C. to 130° C., preferably 60° C. to 120° C., and more preferably 90° C. to 100° C. for 1 to 24 hours, preferably 2 to 10 hours, and more preferably 5 to 8 hours; and then hydrolyzing the products with an acid, preferably hydrochloric acid, at a temperature in the range of 50° C. to 120° C., preferably 80° C. to 120° C., and more preferably 100° C. to 110° C. For example, the reaction product of the step a) may be kept at a temperature of 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C. or 130° C. For example, the reaction product of the step a) may be kept at the temperature for 1 hours, 1.5 hours, 2 hours, 2.5 hours, 3 hours, 3.5 hours, 4 hours, 4.5 hours, 5 hours, 5.5 hours, 6 hours, 6.5 hours, 7 hours, 7.5 hours, 8 hours, 8.5 hours, 9 hours, 9.5 hours, 10 hours, 10.5 hours, 11 hours, 11.5 hours, 12 hours, 12.5 hours, 13 hours, 13.5 hours, 14 hours, 14.5 hours, 15 hours, 15.5 hours, 16 hours, 16.5 hours, 17 hours, 17.5 hours, 18 hours, 18.5 hours, 19 hours, 19.5 hours, 20 hours, 20.5 hours, 21 hours, 21.5 hours, 22 hours, 22.5 hours, 23 hours, 23.5 hours or 24 hours. For example, the hydrolysis temperature may be 50° C., 55° C., 60° C., 65° C., 70° C., 75° C., 80° C., 85° C., 90° C., 95° C., 100° C., 105° C., 110° C., 115° C. or 120° C.

In the processes of the present invention, the glufosinate or its analogue of formula (IV) may be L-configuration or D-configuration, or a mixture of L- and D-configuration.

EXAMPLES

The following examples will be made reference to for further detailedly describing and illustrating the present invention. The examples are intended to assist one of ordinary skill in the art in better understanding and implementing the present invention, and however, not to limit the scope of the present invention.

The absolute yields in the reaction liquids in the following examples were all calculated from the mass percent of L-glufosinate in the reaction liquids obtained from the liquid chromatography.

The following reactions were carried out in all the examples.

Examples A1 to A3: Preparation of L-Glufosinate Hydrochloride (Feeding by Microchannels)

A solution of methyldichlorophosphine (hereinafter referred to as "MDP") at a concentration of 10 wt. % in chlorobenzene and a solution of H3 at a concentration of 10 wt. % in chlorobenzene/ethanol were prepared, respectively.

Figure 1:
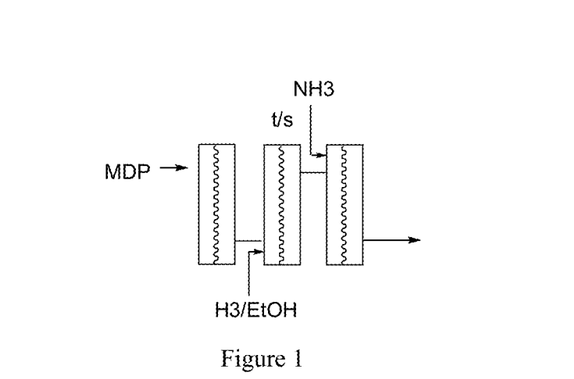
FIG. 1 is a reaction flow diagram of Examples A1 to A3.

A schematic diagram of the reaction process was shown in FIG. 1. The above MDP solution was passed through a microchannel reactor at a flow rate as shown in the following Table 1, and the temperature was lowered to a temperature as shown by T1 in Table 1. The MDP solution and H3 solution then entered into another microchannel reactor simultaneously and reacted at a temperature T2, and the residence time is t. The material stream coming out of the previous microchannel reactor together with ammonia gas entered into the subsequent microchannel reactor (the reaction temperature is T3); thereafter, the temperature of the reaction liquid flowing out of the microchannel reactor was raised to 90° C., the temperature was kept for 8 hours, and then the reaction liquid was hydrolyzed with hydrochloric acid at a temperature of 100° C., thereby obtaining the L-glufosinate hydrochloride.

TABLE 1

| No. | MDP g/min | H3/ethanol g/min | NH3 ml/min | MDP:ethanol:H3:NH3 | T1 °C. | T2 °C. | T3 °C. | Residence time t/s | Absolute yield in reaction liquid % |
|---|---|---|---|---|---|---|---|---|---|
| A1 | 17.27 | 20 | 668 | 1.1:1.1:1:2.6 | −5 | −5 | −5 | 15.4 | 50 |
| A2 | 17.27 | 20 | 668 | 1.1:1.1:1:2.6 | 30 | 30 | 30 | 15.4 | 56 |
| A3 | 17.27 | 20 | 668 | 1.1:1.1:1:2.6 | 25 | 25 | 25 | 15.4 | 52 |

Note:
Each microchannel reactor had a volume of about 8.5 mL. The MDP solution had a density of about 1.16 g/ml, and the H3 solution had a density of about 1.1 g/ml.

Examples B1 to B3: Preparation of L-Glufosinate Hydrochloride (Feeding by Microchannels)

Figure 2:
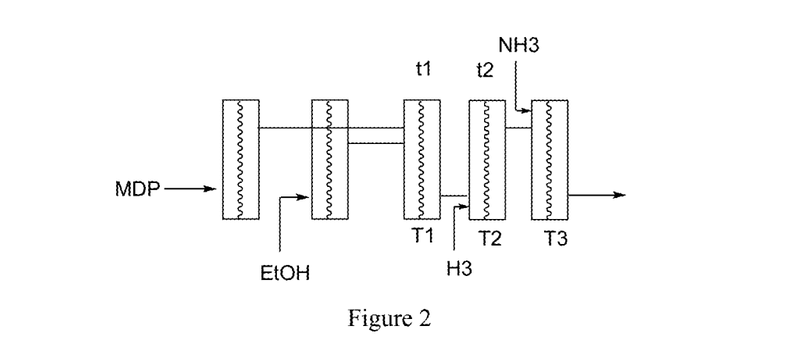
FIG. 2 is a reaction flow diagram of Examples B1 to B3.

L-glufosinate hydrochloride table 2, and the temperature was lowered to a temperature as shown by T1 in the table. The MDP solution and the ethanol solution then entered into another microchannel reactor simultaneously and reacted at a temperature T1, the reaction conditions were shown in the following Table 2, the residence time was t1, and MCP was generated. The MCP reaction liquid obtained and the above H3 solution at a flow rate as listed in the following Table 2 entered into a first microchannel reactor of another set of two microchannel reactors connected in series (the reaction temperature is T2), and the residence time was t2; the material stream coming out of the first microchannel reactor together with ammonia gas entered into the second microchannel reactor (the reaction temperature is T3), and the reaction conditions were shown in the following table. Thereafter, the temperature of the reaction liquid flowing out of the microchannel reactor was raised to 90° C., the temperature was kept for 8 hours, and then the reaction liquid was hydrolyzed with hydrochloric acid at a temperature of 100° C., thereby obtaining the L-glufosinate hydrochloride.

TABLE 2

| No. | MDP g/min | Ethanol g/min | H3 g/min | NH3 ml/min | MDP:ethanol:H3:NH3 | T1 °C. | T2 °C. | T3 °C. | Residence time t1/s | Residence time t2/s | Absolute yield in reaction liquid % |
|---|---|---|---|---|---|---|---|---|---|---|---|
| B1 | 17.27 | 6.11 | 20 | 668 | 1.1:1.1:1:2.6 | −5 | −5 | −5 | 24.7 | 13.3 | 56 |
| B2 | 17.27 | 6.11 | 20 | 668 | 1.1:1.1:1:2.6 | 30 | 30 | 30 | 24.7 | 13.3 | 55 |
| B3 | 17.27 | 6.11 | 20 | 668 | 1.1:1.1:1:2.6 | 25 | 25 | 25 | 24.7 | 13.3 | 55 |

Note:
Each microchannel reactor had a volume of about 8.5 mL. The MDP solution had a density of about 1.16 g/ml, the ethanol solution had a density of 1.059 g/ml, and the H3 solution had a density of about 1.136 g/ml.

The reactions carried out in Examples B1 to B3 included the above reactions.

A solution of MDP at a concentration of 10 wt. % in chlorobenzene, a solution of H3 at a concentration of 10 wt. % in chlorobenzene, and a solution of ethanol at a concentration of 10 wt. % in chlorobenzene were prepared, respectively.

A schematic diagram of the reaction process was shown in FIG. 2. The above MDP solution was passed through a microchannel reactor at a flow rate as shown in the following Examples C1 to C2: Preparation of L-Glufosinate Hydrochloride (Feeding by Microchannels)

A solution of MDP at a concentration of 10 wt. % in chlorobenzene, a solution of H3 at a concentration of 10 wt. % in chlorobenzene, and a solution of ethanol at a concentration of 10 wt. % in chlorobenzene were prepared, respectively.

Figure 3:
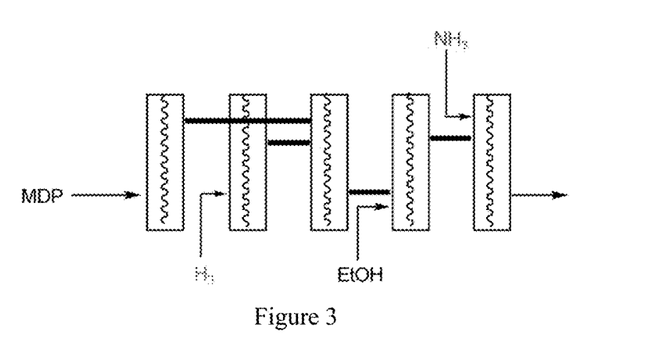
FIG. 3 is a reaction flow diagram of Examples C1 to C2.

A schematic diagram of the reaction process was shown in FIG. 3. After the above MDP solution was passed through a microchannel reactor at a flow rate as shown in the following table 3, it and the H3 solution entered into another microchannel reactor simultaneously and reacted at a temperature T1, the reaction conditions were shown in the following Table 3, and the residence time was t1. The reaction liquid obtained and the above ethanol solution at a flow rate as listed in the following Table 3 entered into a first microchannel reactor of another set of two microchannel reactors connected in series (the reaction temperature is T2), and the residence time was t2; the material stream coming out of the first microchannel reactor together with ammonia gas entered into the second microchannel reactor. Thereafter, the temperature of the reaction liquid flowing out of the microchannel reactor was raised to 90° C., the temperature was kept for 8 hours, and then the reaction liquid was hydrolyzed with hydrochloric acid at a temperature of 100° C., thereby obtaining the L-glufosinate hydrochloride.

TABLE 3

| No. | MDP g/min | Ethanol g/min | H3 g/min | NH$_3$ ml/min | MDP:ethanol:H3:NH$_3$ | T1 ° C. | T2 ° C. | Residence time t1/s | Residence time t2/s | Absolute yield in reaction liquid % |
|---|---|---|---|---|---|---|---|---|---|---|
| C1 | 17.27 | 6.11 | 20 | 668 | 1.1:1.1:1:2.6 | −5 | −5 | 15.7 | 13.3 | 57 |
| C2 | 17.27 | 6.11 | 20 | 668 | 1.1:1.1:1:2.6 | 25 | 25 | 15.7 | 13.3 | 60 |

Note:
Each microchannel reactor had a volume of about 8.5 mL. The MDP solution had a density of about 1.16 g/ml, the ethanol solution had a density of 1.059 g/ml, and the H3 solution had a density of about 1.136 g/ml.

Examples D1 to D14: Preparation of L-Glufosinate Hydrochloride (Feeding by Microchannels and a Tube Reactor)

A solution of IMDP in chlorobenzene, a solution of H3 in chlorobenzene, and a solution of ethanol in chlorobenzene at concentrations as shown in the following table 4 were prepared, respectively.

Figure 4:
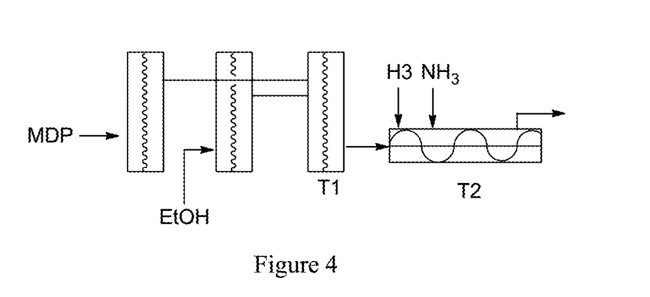
FIG. 4 is a reaction flow diagram of Examples D1 to D14.

A schematic diagram of the reaction process was shown in FIG. 4. After the above MDP solution and ethanol solution were each precooled by passing through a microchannel reactor at a flow rate as shown in the following table 4, they entered into a microchannel reactor simultaneously to react with each other (at a temperature T1), and the residence time is t1; the reaction liquid obtained was passed through a tube reactor to react with the above H3 solution and ammonia gas at a flow rate as shown in the following table 4 (at a temperature T2), and the residence time is t2; thereafter, the temperature of the reaction liquid flowing out of the tube reactor was raised to 90° C., the temperature was kept for 8 hours, and then the reaction liquid was hydrolyzed with hydrochloric acid at a temperature of 100° C., thereby obtaining the L-glufosinate hydrochloride.

TABLE 4

| No. | MDP g/min | Ethanol g/min | H3 g/min | NH3 g/min | the equivalent ration of MDP:ethanol:H3:NH3 | the concentration by weight of MDP solution:ethanol solution:H3 solution | T1 ° C. | T2 ° C. | Residence time t1/s | Residence time t2/min | Absolute yield in reaction liquid % |
|---|---|---|---|---|---|---|---|---|---|---|---|
| D1 | 48.99 | 21.6 | 60 | 3.84 | 1.3:1.3:1:3.1 | 25/20/20 | 0 | 5 | 8.2 | 12.2 | 53 |
| D2 | 48.99 | 21.6 | 60 | 3.84 | 1.3:1.3:1:3.1 | 25/20/20 | −15 | 5 | 8.2 | 12.2 | 71 |
| D3 | 41.45 | 18.33 | 60 | 3.61 | 1.1:1.1:1:2.64 | 25/20/20 | −15 | 5 | 9.1 | 12.8 | 67.7 |
| D4 | 41.45 | 18.33 | 60 | 3.61 | 1.1:1.1:1:2.64 | 25/20/20 | −15 | −15 | 9.1 | 12.8 | 66.2 |
| D5 | 34.54 | 30.56 | 100 | 3.01 | 1.1:1.1:1:2.64 | 25/10/10 | −15 | −15 | 8.8 | 9.6 | 69.6 |
| D6 | 37.68 | 33.33 | 100 | 3.28 | 1.2:1.2:1:2.88 | 25/10/10 | −15 | −15 | 8.1 | 9.3 | 68.7 |
| D7 | 77.77 | 30.56 | 100 | 2.71 | 1.1:1.1:1:2.64 | 10/10/10 | −5 | 5 | 5.3 | 7.6 | 59 |
| D8 | 77.77 | 30.56 | 100 | 2.71 | 1.1:1.1:1:2.64 | 10/10/10 | 5 | 5 | 5.3 | 7.6 | 62 |
| D9 | 77.77 | 30.56 | 100 | 2.71 | 1.1:1.1:1:2.64 | 10/10/10 | −25 | 5 | 5.3 | 7.6 | 51 |
| D10 | 70.7 | 27.78 | 100 | 2.46 | 1:1:1:2.4 | 10/10/10 | −15 | 5 | 5.8 | 8 | 51.6 |

Note:
Each microchannel reactor had a volume of about 8.5 mL. The MDP solution having a concentration of 10% by weight had a density of about 1.16 g/ml, the MDP solution having a concentration of 25% by weight had a density of about 1.19 g/ml, the ethanol solution having a concentration of 10% by weight had a density of 1.059 g/ml, the ethanol solution having a concentration of 20% by weight had a density of about 1.03 g/ml, the H3 solution having a concentration of 10% by weight had a density of 1.136 g/ml, and the H3 solution having a concentration of 20% by weight had a density of about 1.136 g/ml. The tube reactor had a volume of 1.4 L.

The reactions in Example D11 were carried out in the same way as those in Example D5 in the above table 4, except that in Example D11, triethylamine of the same mole number was used to replace the ammonia gas, wherein flow rates of reactants, equivalent ratio of reactants, concentration ratio of reactants, reaction temperature, residence time and yields are shown in Table 5.

TABLE 5

| No. | MDP g/min | Ethanol g/min | H3 g/min | triethylamine g/min | the equivalent ration of MDP:ethanol:H3:triethylamine | the concentration by weight of MDP solution:ethanol solution:H3 solution | T1 °C. | T2 °C. | Residence time t1/s | Absolute yield in reaction liquid % |
|---|---|---|---|---|---|---|---|---|---|---|
| D11 | 34.54 | 30.56 | 100 | 16.43 | 1.1:1.1:1:2.64 | 25/10/10 | −15 | −15 | 8.9 | 59.6 |

The reactions in Examples D12 to D14 were carried out in the same way as those in Example D5 in the above table 4, except that in Examples D12 to D14, the alcohols listed in the table 6 were used to replace the ethanol, wherein the flow rate of H3, the equivalent ration of reactants, the reaction temperature, residence time and yields are shown in the following Table 6.

TABLE 6

| No. | Type of alcohol | H3 g/min | the equivalent ration of MDP:alcohol:H3:NH3 | T1 °C. | T2 °C. | Absolute yield in reaction liquid % |
|---|---|---|---|---|---|---|
| D12 | isopropanol | 100 | 1.1:1.1:1:2.64 | −15 | −15 | 61 |
| D13 | n-butanol | 100 | 1.1:1.1:1:2.64 | −15 | −15 | 66 |
| D14 | n-propanol | 100 | 1.1:1.1:1:2.64 | −15 | −15 | 54 |

Example E: Preparation of L-Glufosinate Hydrochloride (Tank Reactor)

155 g of a solution of MDP at a concentration of 10 wt. % in chlorobenzene, 200 g of a solution of H3 at a concentration of 10 wt. % in chlorobenzene, and 61.12 g of a solution of ethanol at a concentration of 10 wt. % in chlorobenzene were prepared, respectively.

61.12 g of the above ethanol solution was added to a tank reactor and cooled to −15° C., 155 g of the above DMP solution was slowly and dropwise added, and after the addition, the reaction liquid was stirred for 5 minutes. Then, 200 g of the above H3 solution and 32.2 g of triethylamine were added dropwise, and after the addition, the mixture obtained was heated to 90° C. to carry out rearrangement reaction for about 2 hours. After that, the mixture obtained was desolvated under reduced pressure, and was hydrolyzed with concentrated hydrochloric acid to obtain L-glufosinate hydrochloride. The absolute yield in reaction liquid of the product was 65.4%.

The above description is exemplary, rather than limited. Variations in and amendments to the embodiments disclosed as above will be obvious to one of ordinary skill in the art, and indeed fall within the scope contained in the present disclosure. Accordingly, the scope of legal protection of the present disclosure can only be determined through study on the claims annexed hereto.

For the purposes of explaining and describing, the above description of the embodiments has been provided. It does not intend to enumerate or limit the present disclosure. The individual elements or features of a specific embodiment are generally not limited to the specific embodiment, and where applicable, are interchangeable, and can be used in a selected embodiment even if they are not specifically shown or described. They can also vary in many ways. Such modifications should not be considered as extending away from the present disclosure, and all such amendments are intended to be included within the scope of the present disclosure.

Exemplary embodiments are provided so that the present disclosure will be thorough, and the scope is completely conveyed to one of ordinary skill in the art. Numerous specific details are set forth, for example, the examples of specific components, devices, and methods, so as to provide a thorough understanding on embodiments of the present disclosure. It will be obvious to one of ordinary skill in the art that specific details need not be applied, exemplary embodiments may be embodied in many different forms, and neither of them should be construed as limiting the scope of the present disclosure. In some exemplary embodiments, well-known processes, well-known device structures, and well-known technologies are not described in detail.

The terms used herein are for the purpose of describing particular exemplary embodiments only, and is not intended to limit. The terms "comprising", "including" and "having" are inclusive and thus specify the presence of the features, integers, steps, operations, elements and/or components, but do not exclude the presence or addition of one or more other features, integers, steps, operations, elements, components and/or combinations thereof. Unless explicitly identified as a performing sequence, process steps, procedures, and operations described herein should not be construed as necessarily requiring performing in the particular sequence discussed or illustrated. It should also be understood that additional or alternative steps may be employed.

What is claimed is:

1. A process for preparing glufosinate or its analogues of formula (IV), characterized in that, (IV)

the process comprises:

a) reacting a compound of formula (II), an alcohol of formula (III) and a compound of formula (V), and b) subjecting products obtained from the above reaction to a hydrolysis, to obtain the glufosinate or its analogue of formula (IV), wherein $R_1$ and $R_2$ are each independently selected from $C_1$-$C_{16}$ alkyl, $C_6$-$C_{12}$ aryl, $C_3$-$C_{10}$ cycloalkyl, $C_7$-$C_{12}$ alkaryl and $C_7$-$C_{12}$ aralkyl, each group being unsubstituted or substituted by $C_1$-$C_6$ alkyl, $C_1$-$C_6$ alkoxy, dialkyl or dialkylamino;

$Hal_1$ is halogen;

$Hal^2$ is halogen,

PG is hydrogen or an amino-protecting group, wherein when PG is the amino-protecting group, the process further comprises removing the amino-protecting group, and X is —$OR_3$ or —$NR_3R_4$, wherein $R_3$ is $C_1$-$C_{16}$ alkyl, $C_6$-$C_{16}$ aryl, $C_3$-$C_{16}$ cycloalkyl, $C_7$-$C_{16}$ aralkyl or $C_7$-$C_{16}$ alkaryl, wherein the groups are each unsubstituted or substituted by $C_1$-$C_6$ alkyl; and $R_4$ is hydrogen or as defined for $R_3$; and wherein the molar ratio of the compound of formula (II) and the alcohol of formula (III) in the process is 1:(0.1-1.1).

2. The process according to claim 1, characterized in that, $R_1$ is $C_1$-$C_{16}$ alkyl, cyclohexyl, cyclopentyl or phenyl, wherein each group is unsubstituted or substituted by $C_1$-$C_6$ alkyl, $C_1$-$C_6$ alkoxy or dialkylamino;

$R_2$ is $C_1$-$C_6$ alkyl; and/or $Hal_1$ and $Hal^2$ are each independently fluorine, chlorine, bromine or iodine.

3. The process according to claim 1, characterized in that, $R_1$ is methyl, $R_2$ is ethyl, PG is hydrogen, and $Hal_1$ and $Hal^2$ are each independently chlorine.

4. The process according to claim 1, characterized in that, the compound of formula (II) is dichloromethylphosphine, dichloroethylphosphine, dichloropropylphosphine, dichlorobutylphosphine, dichlorocyclohexylphosphine, dichlorophenylphosphine, dichloro-4-methoxyphenylphosphine or dichloro-4-dimethylaminophenylphosphine.

5. The process according to claim 1, characterized in that, the alcohol of formula (III) is methanol, ethanol, n-propanol, isopropanol or n-butanol.

6. The process according to claim 1, characterized in that, step a) is carried out by:

1) mixing the compound of formula (II), the alcohol of formula (III), the compound of formula (V) and a solvent together; or 2) mixing the compound of formula (II) and the alcohol of formula (III), and then mixing the resultant product with the compound of formula (V); or 3) mixing the compound of formula (II) and the compound of formula (V), and then mixing the resultant product with the alcohol of formula (III).

7. The process according to claim 1, characterized in that, when all the reactions of step a) are carried out in microchannel reactors, the reactions of step a) are conducted at a reaction temperature ranging from −30° C. to 50° C.; or when the reactions of step a) are carried out in reactors consisting of a microchannel reactor and a tube reactor, or in a tank reactor, the reactions of step a) are conducted at a reaction temperature ranging from −30° C. to 50° C.

8. The process according to claim 1, characterized in that, a molar ratio of the compound of formula (II), the alcohol of formula (III) and the compound of formula (V) is 1:(0.1-1.1):(0.1-2).

9. The process according to claim 1, characterized in that, $Hal^2$ is chlorine; PG is H, —C(O)—$R_5$, —$SO_2$—$R_6$, —CHC(O)O—$R_7$ or —C(O)$OR_8$, wherein $R_5$ is $C_6$-$C_{16}$ aryl, $C_7$-$C_{16}$ aralkyl or $C_7$-$C_{16}$ alkaryl; $R_6$ is $C_6$-$C_{16}$ aryl, $C_7$-$C_{16}$ aralkyl or $C_7$-$C_{16}$ alkaryl; and $R_7$ and $R_8$ are each independently $C_1$-$C_{16}$ alkyl, $C_6$-$C_{16}$ aryl, $C_3$-$C_{16}$ cycloalkyl, $C_7$-$C_{16}$ aralkyl or $C_7$-$C_{16}$ alkaryl; and X is —$OR_3$, wherein $R_3$ is $C_1$-$C_8$ alkyl or $C_7$-$C_{10}$ aralkyl.

10. The process according to claim 1, characterized in that, the hydrolysis is acid hydrolysis or base hydrolysis, wherein the acid hydrolysis is conducted with an inorganic or organic acid, and the base hydrolysis is conducted with an inorganic or organic base.

11. The process according to claim 1, characterized in that, the step a) is conducted in the absence of a solvent or in the presence of an inert solvent, wherein the inert solvent is any one or more than one of benzene solvents, amide solvents, hydrocarbon solvents, halohydrocarbon solvents, sulfone or sulfoxide solvents, ether solvents or ester solvents.

12. The process according to claim 1, characterized in that, a base is added at the beginning of, during and or after the reaction of step a).

13. The process according to claim 12, characterized in that, the organic base is an organic amine selected from triethylamine, pyridine or pyridine derivatives having 1 to 3 substituents attached to one or more carbon atoms of the heterocycle, or piperidine or piperidine derivatives having 1 to 3 substituents attached to one or more carbon atoms of the heterocycle.

14. The process according to claim 1, characterized in that, step a) is carried out by: (i) simultaneously entering the compound of formula (II), the alcohol of formula (III) and the compound of formula (V) into a first reactor to react with each other in the presence of a solvent, and then entering the resultant product and a base, into a second reactor together; or (ii) simultaneously entering the compound of formula (II) and the alcohol of formula (III) into a first reactor to react with each other in the presence of a solvent or in the absence of a solvent, then entering the resultant product and the compound of formula (V) into a second reactor, and finally entering the resultant product and a base, into a third reactor together to react with each other; or (iii) simultaneously entering the compound of formula (II) and the compound of formula (V) into a first reactor to react with each other in the presence of a solvent or in the absence of a solvent, then entering the resultant product and the alcohol of formula (III) into a second reactor, and finally entering the resultant product and a base, into a third reactor together to react with each other; or (iv) simultaneously entering the compound of formula (II) and the alcohol of formula (III) into a first reactor to react with each other in the presence of a solvent or in the absence of a solvent, and then entering the resultant product, the compound of formula (V) and a base, into a second reactor together to react with each other.

15. The process according to claim 14, characterized in that, the first reactor, the second reactor and/or the third reactor are each independently selected from a microchannel reactor, a tube reactor, a tubular packed reactor, a stirred tank reactor or any combinations thereof.

16. The process according to claim 14, characterized in that, the step a) is carried out by: (i) simultaneously entering the compound of formula (II) and the alcohol of formula (III) and the compound of formula (V) into a first microchannel reactor to react with each other in the presence of a solvent, and then entering the resultant product and a base, into a second microchannel reactor together; or (ii) simultaneously entering the compound of formula (II) and the alcohol of formula (III) into a first microchannel reactor to react with each other in the presence of a solvent or in the absence of a solvent, then entering the resultant product and the compound of formula (V) into a second microchannel reactor, and finally entering the resultant product and a base, into a third microchannel reactor together to react with each other; or (iii) simultaneously entering the compound of formula (II) and the compound of formula (V) into a first microchannel reactor to react with each other in the presence of a solvent or in the absence of a solvent, then entering the resultant product and the alcohol of formula (III) into a second microchannel reactor, and finally entering the resultant product and a base, into a third microchannel reactor together to react with each other; or (iv) simultaneously entering the compound of formula (II) and the alcohol of formula (III) into a first microchannel reactor to react with each other in the presence of a solvent or in the absence of a solvent, and then entering the resultant product, the compound of formula (V) and a base, into a tube reactor together to react with each other.

17. The process according to claim 16, characterized in that, in embodiment (i), the temperatures in the first microchannel reactor and/or the second microchannel reactor each range independently from $-30°$ C. to $50°$ C., wherein the above temperatures are the same or different; in embodiment (ii), the temperatures in the first microchannel reactor, the second microchannel reactor and/or the third microchannel reactor each range independently from $-30°$ C. to $50°$ C., wherein the above temperatures are the same or different; in embodiment (iii), the temperatures in the first microchannel reactor, the second microchannel reactor and/or the third microchannel reactor each range independently from $-30°$ C. to $50°$ C., wherein the above temperatures are the same or different; and in embodiment (iv), the temperature in the first microchannel reactor ranges from $-30°$ C. to $50°$ C.; and/or the temperature in the tube reactor is from $-30°$ C. to $50°$ C.

18. The process according to claim 14, characterized in that, in the step a), when the reactors merely consist of microchannel reactors, the total residence time in all the reactors is in the range of 0.1 seconds to 300 seconds; or when the reactors consist of a microchannel reactor and a tube reactor, the total residence time in all the reactors is in the range of 1 minute to 20 minutes.

19. The process according to claim 1, characterized in that, the step b) is conducted by: raising the temperature of the reaction product obtained from step a) to be in a range of $30°$ C. to $130°$ C. for 1 to 24 hours; and then hydrolyzing the products with an acid, at a temperature in the range of $50°$ C. to $120°$ C.

20. The process according to claim 1, characterized in that,
$R_1$ is selected from methyl, ethyl, propyl, isopropyl, butyl, isobutyl, amyl, hexyl, phenyl, benzyl, phenethyl, phenylpropyl, methylphenyl, ethylphenyl and propylphenyl, and/or
$R_2$ is $C_1$-$C_8$ alkyl.

21. The process according to claim 2, characterized in that,
$R_1$ is methyl, ethyl, propyl, butyl, amyl or hexyl; and/or
$R_2$ is methyl, ethyl, propyl, butyl, amyl or hexyl.

22. The process according to claim 7, characterized in that, when all the reactions of step a) are carried out in microchannel reactors, the reactions of step a) are conducted at a reaction temperature ranging from $-5°$ C. to $30°$ C.; or when the reactions of step a) are carried out in reactors consisting of a microchannel reactor and a tube reactor, or in a tank reactor, the reactions of step a) are conducted at a reaction temperature ranging from $-15°$ C. to $5°$ C.

23. The process according to claim 8, characterized in that, the molar ratio of the compound of formula (II), the alcohol of formula (III) and the compound of formula (V) is 1:(0.9-1.1):(0.7-1).

24. The process according to claim 9, characterized in that,
$R_5$ is $C_6$-$C_{12}$ aryl, $C_7$-$C_{13}$ aralkyl or $C_7$-$C_{13}$ alkaryl;
$R_6$ is $C_6$-$C_{12}$ aryl, $C_7$-$C_{13}$ aralkyl or $C_7$-$C_{13}$ alkaryl;
$R_7$ and $R_8$ are each independently $C_1$-$C_8$ alkyl, $C_6$-$C_{12}$ aryl, $C_3$-$C_{10}$ cycloalkyl, $C_7$-$C_{12}$ aralkyl or $C_7$-$C_{12}$ alkaryl; and/or
$R_3$ is $C_1$-$C_6$ alkyl or $C_7$-$C_9$ aralkyl.

25. The process according to claim 24, characterized in that,
$R_5$ is phenyl, tolyl, benzyl or phenylethyl;
$R_6$ is phenyl, tolyl, benzyl or phenylethyl;
$R_7$ and $R_8$ are each independently methyl, ethyl, any isomer of propyl and butyl, phenyl, benzyl, phenethyl, tolyl, ethylphenyl, cyclopropyl, cyclobutyl or cyclopentyl; and/or
$R_3$ is methyl, ethyl, propyl, isopropyl, butyl, isobutyl or benzyl.

26. The process according to claim 10, wherein the inorganic acid is hydrochloric acid or sulfuric acid.

27. The process according to claim 11, wherein the inert solvent is selected from any one or more than one of chlorobenzene, trimethylbenzene, 1,4-dioxane, 1,2-dichloroethane, dimethyl sulfoxide, N-methylpyrrolidone, N,N-dimethylformamide, petroleum ether, n-heptane, tetrahydrofuran, methyltetrahydrofuran, benzene, toluene, ethyl acetate, and butyl acetate.

28. The process according to claim 12, characterized in that, the base is added after the reaction of step a).

29. The process according to claim 28, characterized in that, the base is an organic base or ammonia.

30. The process according to claim 15, characterized in that, the first reactor, the second reactor and/or the third reactor each independently consist of one or more microchannel continuous flow reactors; or each independently consist of one or more microchannel continuous flow reactors and one or more tube reactors.

31. The process according to claim 16, characterized in that, the base is ammonia gas.

32. The process according to claim 17, characterized in that,
in embodiment (i), the temperatures in the first microchannel reactor and/or the second microchannel reactor each range independently from −5° C. to 30° C., wherein the above temperatures are the same or different;

in embodiment (ii), the temperatures in the first microchannel reactor, the second microchannel reactor and/or the third microchannel reactor each range independently from −5° C. to 30° C., wherein the above temperatures are the same or different;

in embodiment (iii), the temperatures in the first microchannel reactor, the second microchannel reactor and/or the third microchannel reactor each range independently from −5° C. to 30° C., wherein the above temperatures are the same or different; and in embodiment (iv), the temperature in the first microchannel reactor ranges from −25° C. to 5° C.; and/or the temperature in the tube reactor is from −20° C. to 5° C.

33. The process according to claim 18, characterized in that, in the step a), when the reactors merely consist of microchannel reactors, the total residence time in all the reactors is in the range of 10 seconds to 40 seconds; or when the reactors consist of a microchannel reactor and a tube reactor, the total residence time in all the reactors is in the range of 9 minutes to 14 minutes.

34. The process according to claim 19, characterized in that, the step b) is conducted by:
raising the temperature of the reaction product obtained from step a) to be in a range of 90° C. to 100° C.;
keeping the temperature for 5 to 8 hours;
hydrolyzing the products with an acid at a temperature in the range of 100° C. to 110° C.; and/or
the acid is hydrochloric acid.

\* \* \* \* \*